United States Patent [19]
Lee

[11] Patent Number: 5,460,745
[45] Date of Patent: Oct. 24, 1995

[54] HYDRIDE COMPOSITIONS

[75] Inventor: Myung W. Lee, North Augusta, S.C.

[73] Assignee: United States Department of Energy, Washington, D.C.

[21] Appl. No.: 192,265

[22] Filed: Feb. 7, 1994

[51] Int. Cl.$^6$ .................................. C01B 3/08; C01B 6/24
[52] U.S. Cl. ................ 252/182.32; 206/0.7; 252/182.33; 423/644; 423/658.2
[58] Field of Search .............................. 423/644, 658.2; 206/0.7; 252/182.32, 182.33

[56] References Cited

U.S. PATENT DOCUMENTS

| | | | |
|---|---|---|---|
| 4,200,623 | 4/1980 | Muller et al. | 423/644 |
| 4,358,316 | 11/1982 | Liu et al. | 75/123 |
| 4,378,331 | 3/1983 | Bruning et al. | 420/455 |
| 4,409,180 | 10/1983 | Sandrock et al. | 420/455 |
| 4,489,050 | 12/1984 | van Esseen et al. | 423/644 |
| 4,556,551 | 12/1985 | Wallace et al. | 423/644 |
| 4,668,424 | 5/1987 | Sandrock | 252/181.3 |
| 4,744,946 | 5/1988 | Sasai et al. | 420/443 |
| 4,946,646 | 8/1990 | Gamo et al. | 423/644 |
| 5,006,328 | 4/1991 | Hong | 423/644 |
| 5,028,389 | 7/1991 | Lee et al. | 420/422 |

Primary Examiner—Wayne Langel
Attorney, Agent, or Firm—Brian R. Tumm; Harold M. Dixon; William R. Moser

[57] ABSTRACT

A composition for use in storing hydrogen, and a method for making the composition. The composition comprises a mixture of two or more hydrides, each hydride having a different series of hydrogen sorption isotherms that contribute to the overall isotherms of the mixture. The hydrides are chosen so that the isotherms of the mixture have regions wherein the hydrogen equilibrium pressure increases with increasing hydrogen, preferably linearly. The isotherms of the mixture can be adjusted by selecting hydrides with different isotherms and by varying the amounts of the individual hydrides, or both. Preferably, the mixture is made up of hydrides that have isotherms with substantially flat plateaus and in nearly equimolar amounts. The composition is activated by degassing, exposing to hydrogen and then heating at a temperature below the softening temperature of any of the constituents so that their chemical and structural integrity is preserved. When the composition is used to store hydrogen, its hydrogen content can be found simply by measuring $P_{H_2}$ and determining H/M from the isothermic function of the composition.

15 Claims, 3 Drawing Sheets

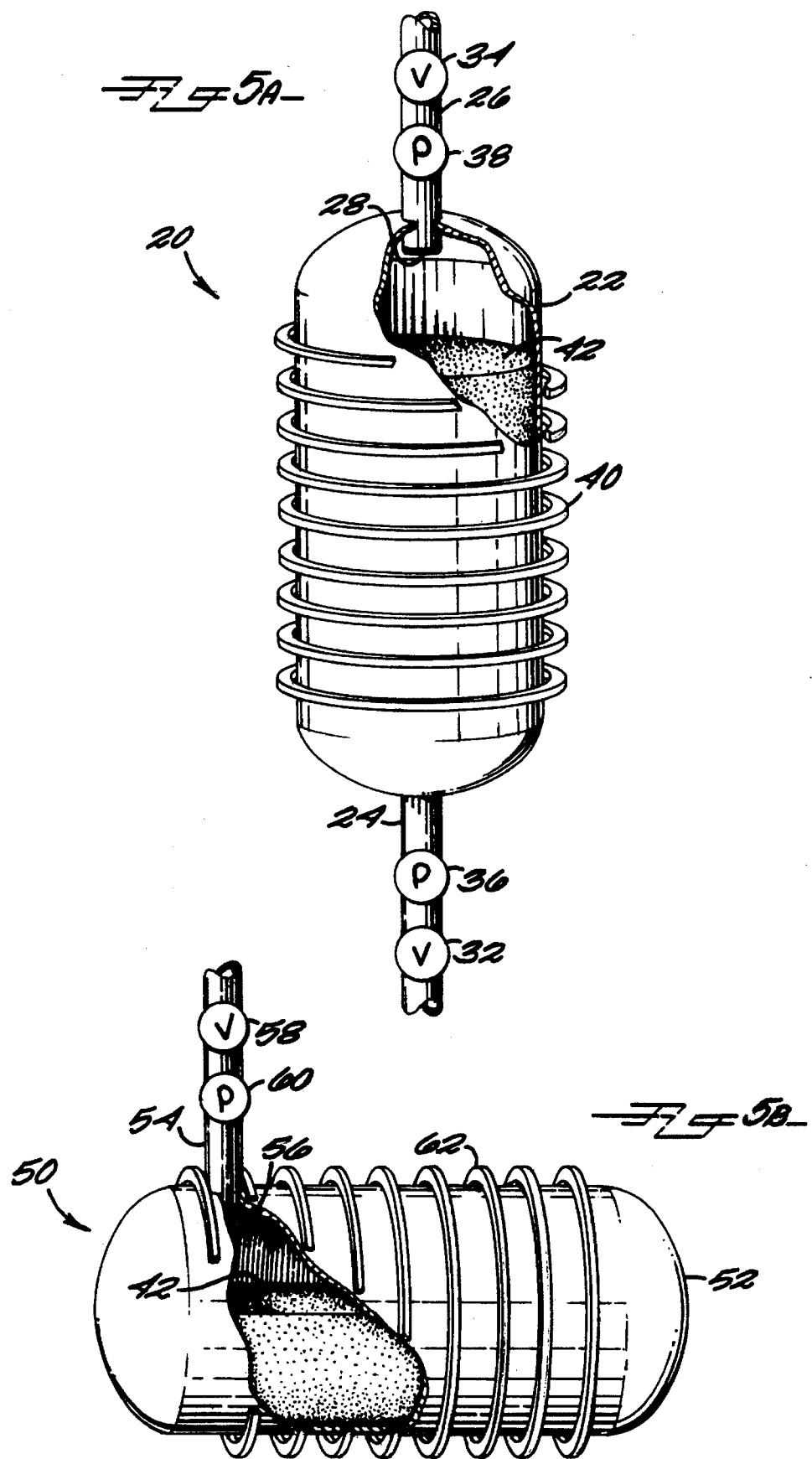

HYDRIDE COMPOSITIONS

BACKGROUND OF THE INVENTION

1. Field of the Invention

The present invention relates to hydride compositions for use in storing hydrogen. In particular, the present invention relates to metal hydride compositions made so that hydrogen is absorbed as a preselected function of pressure. The United States Government has rights in this invention pursuant to Contract No. DE-AC09-89SR18035 between the U.S. Department of Energy and Westinghouse Savannah River Company.

2. Discussion of Background

Hydride formers (sometimes simply referred to as "hydrides") are capable of absorbing hydrogen which can then be desorbed under the appropriate temperature and pressure conditions. These materials have many applications, particularly in the hydrogen processing and energy conversion fields where they are used for hydrogen storage, hydrogen pumping and compression, heat pumps, batteries, and fuel cells. Many hydrides absorb the three isotopes of hydrogen (protium, deuterium, tritium) at different rates. These hydrides are useful in hydrogen isotopic purification and separation processes.

Known hydrides include many pure metals (Mg, Ti, V, Nb, Pt, Pd, and so forth), alloys (La—, Mg—, Ti—, and Co— alloys, Ti—Fe alloys, and rare earth-Ni alloys), and hydride compositions including those described in commonly-assigned patent applications Ser. Nos. 07/933,152, filed Aug. 21, 1992 (Palladium/Kieselguhr Composition and Method), 07/952,931, filed Sep. 29, 1992 (Dimensionally Stable Metallic Hydride Composition), 07/967,653, filed Oct. 28, 1992 (Composition For Catalyzing Hydrogen Isotope Exchange), and 07/999,338, filed Dec. 31, 1992 (Tetraethyl Orthosilicate-Based Glass Composition and Method), the disclosures of which are incorporated herein by reference. The hydrogen absorption/desorption capacity of a particular hydride depends on its composition, temperature and surface area, and on the external hydrogen gas pressure. To maximize the available surface area and the absorption/desorption efficiency, hydrides are often supplied in the form of small-grained particles or pellets.

The hydrogen-storage capacity of a hydride may be determined by plotting isotherms of the hydrogen equilibrium pressure ($P_{H_2}$, $P_{eq}$) versus the hydrogen content of the hydride at a predetermined temperature. At the equilibrium pressure, the partial pressure of hydrogen outside the hydride equals the pressure of the hydrogen absorbed by the hydride. The hydrogen content may be measured in any convenient units, including weight (grams $H_2$/grams hydride), atomic weight (mols $H_2$/mols hydride), or the ratio of hydrogen atoms to metal atoms in the hydride (H/M).

A series of hydrogen sorption isotherms is illustrated schematically in FIG. 1. Each isotherm 10a, 10b, 10c, 10d has a plateau region—a region of approximately constant pressure (the "plateau pressure") where the hydride absorbs or releases large quantities of hydrogen with relatively small changes in pressure. The plateau pressures for absorption and desorption may be different, a phenomenon known as hysteresis. Useful hydrides have low hysteresis, that is, absorption and desorption pressures are close and long, approximately flat plateaus.

In typical hydrides, the plateau pressure increases with temperature over the useful operating range of the material. Thus, isotherms 10a, 10b, . . . represent the hydrogen equilibrium pressure versus the hydrogen content of a single hydride, with each isotherm measured at a different temperature. The isotherms are also characteristic of the particular hydride, thus, different hydrides have isotherms with different plateau pressures and different H/M ratios. The plateaus may occur at different pressure levels and may start and end at different H/M ratios.

Hydrides with well-defined plateaus include quaternary alloys having the formula $Zr_{1-x}Ti_xCr_{1-y}Fe_{1+y}$, where $0.05 \leq x \leq 0.2$ and $0 \leq y \leq 0.4$ (Lee, et al., U.S. Pat. No. 5,028,389); alloys of the formula $Fe_{1-x}Mn_xTi_{1-y}V_y$, where $0 \leq x \leq 0.2$ and $0.005 \leq y \leq 0.08$ (Liu, et al., U.S. Pat. No. 4,358,316); and $ZrMn_2$-type alloys (Van Essen, et al., U.S. Pat. No. 4,489,050). Alloys that contain lanthanum and/or nickel may also have well-defined plateaus (Sasai, et al., U.S. Pat. No. 4,744,946; Sandrock, U.S. Pat. No. 4,668,424; Sandrock, et al., U.S. Pat. No. 4,409,180; Bruning, et al., 4,378,331).

For many applications, it is desirable to be able to measure the hydrogen content of a hydride with a reasonable degree of accuracy in order to determine whether the hydride is saturated or whether it can absorb more hydrogen. However, it is difficult to measure the hydrogen content directly, for example, by measuring the pressure and determining the hydrogen content from the appropriate isotherm. In the useful operating range of the hydride—the plateau region—data derived from pressure measurements are unreliable since very small pressure changes are associated with large changes in H/M. The inaccuracy in pressure measurement corresponds to a large variation in hydrogen content. Instead of using pressure as a measure of hydrogen content, hydrogen is desorbed from the hydride to a container having a known volume, and the quantity of hydrogen calculated from temperature and pressure measurements using the ideal gas law. There is a need for a way to determine hydrogen content of a hydride accurately and directly, without desorbing stored hydrogen from the composition.

SUMMARY OF THE INVENTION

According to its major aspects and broadly stated, the present invention is a composition for use in storing hydrogen and a method for making the composition where there is no plateau region, and where pressure increases significantly with hydrogen content, preferably linearly, so that measurement of pressure provides a good indication of hydrogen content. The composition comprises a mixture of hydrides each of which has a different isotherm. When the mixture is formed, the resultant isotherm has no plateau but increases in a well-behaved, controlled way so that pressure and hydrogen content can be correlated. Preferably, the individual hydrides are chosen so that their composite isotherm is a linear function for ease in determining the hydrogen content from the pressure and, thus, in controlling the absorption and desorption of hydrogen.

This result is achieved by comparing the locations of plateau regions of several hydrides and selecting more than one so that each has a different plateau region. To prepare the composition, the selected hydride particles, in the desired size (preferably less than 100 microns) are mixed, activated by degassing, saturated with hydrogen, and heated to remove the absorbed hydrogen. Processing temperatures are lower than the melting or softening points of the individual hydrides in order to maintain the chemical and structural integrity of the individual hydride types.

When the composition is used for hydrogen storage, the amount of stored hydrogen can be found simply by measuring the equilibrium pressure and determining the hydrogen content from the appropriate isotherm without the need for desorbing the stored hydrogen. Thus, it can be more readily determined whether the composition is capable of absorbing more hydrogen, or whether all hydrogen has indeed been desorbed. The composition can be used to store hydrogen, separate hydrogen from a gaseous mixture, or, with a suitable choice of hydrides, separate the three hydrogen isotopes (protium, deuterium, tritium) from each other.

An important feature of the invention is the selecting of hydrides for making the mixture that do not have plateaus at the same region. By selecting hydrides to avoid having the same plateaus, the isotherm of the composite mixture will have a continuously rising hydrogen/metal atom content with increasing pressure. Selecting the types of hydride and amounts of each will determine the shape of the composite isotherm. Thus, by choosing suitable hydrides, a mixture can be provided that exhibits a readily measurable change in equilibrium pressure over any desired hydrogen content range. Most preferably, the isotherms of the mixture have approximately linear regions when plotted on a logarithmic scale, that is, $\ln P_{H_2} = a + b(H/M)$, where $P_{H_2}$ is the pressure, H/M the hydrogen content, and a and b are constants for each particular hydride mixture.

Another advantage of the selection of several hydrides to form a hydride composition mixture is the reduction of hysteresis effects.

Another feature of the present invention is the processing of the different hydride types below their melting temperature to preserve their individual hydrogen absorption response.

The steadily increasing hydrogen content with pressure of the hydride composition when made according to the present process is another important feature of the present invention. Such a composition lends itself readily to measurement of the amount of hydrogen contained, essential for effective process control.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 5a is a partially cut-away view of an apparatus for storing and releasing hydrogen using a composition according to a preferred embodiment of the invention; and FIG. 5b is a partially cut-away view of an alternative embodiment of an apparatus for storing and releasing hydrogen using a composition according to a preferred embodiment of the present invention.

DETAILED DESCRIPTION OF PREFERRED EMBODIMENTS

It has been found that the hydrogen sorption isotherm of a mixture of several hydrides can have an hydrogen equilibrium pressure ($P_{H_2}$) that varies in a well-behaved, steadily increasing manner with increasing absorbed hydrogen (H/M). When such a mixture is used in a hydride bed, the measured pressure indicates accurately and directly the quantity of absorbed hydrogen and the overall fraction of the bed's capacity that is used. Preferably, the mixture is made up of hydrides selected from those that have sorption isotherms with substantially flat plateaus, particularly, mixtures containing hydrides of a single group or family of alloys. As used herein, the term "family" refers to an alloy containing two or more constituent metals whose proportions can be varied, where the "members" of the family are hydrides with slightly different proportions of those constituents. Each hydride belonging to this family will have a set of sorption isotherm depending on the temperature of operation and, at a specified operating temperature, each will have a different isotherm. If properly mixed in accordance with the present invention, the hydrogen isotherm of the alloy mixture can have a preselected shape. Most preferably, the isotherms of the mixture have regions where $\ln P_{H_2}$ varies in an approximately linear manner with H/M.

Figure 1:
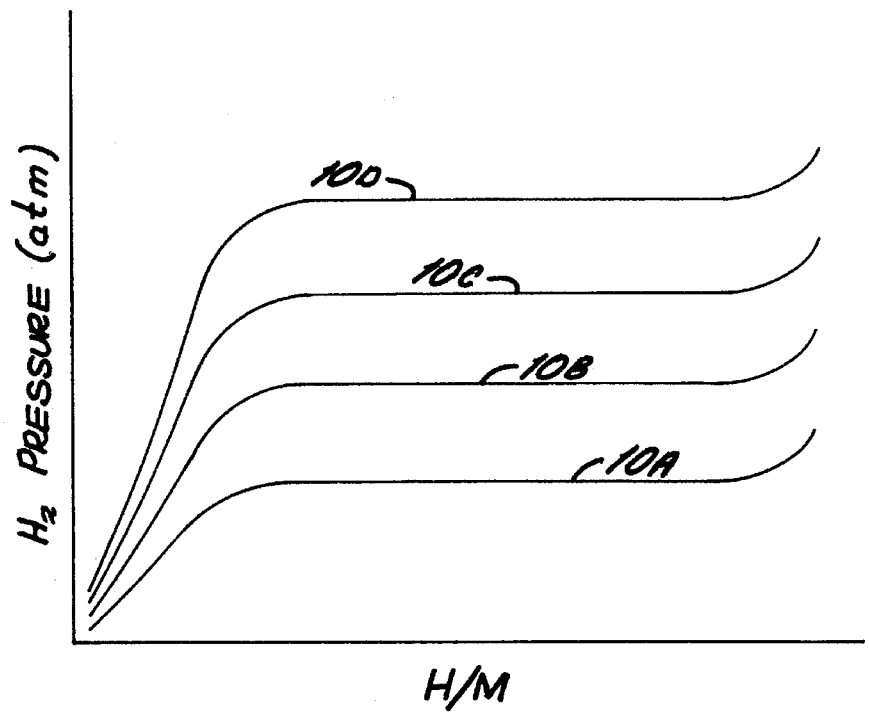
FIG. 1 shows a series of schematic hydrogen sorption isotherms for a hydride.
Figure 2:
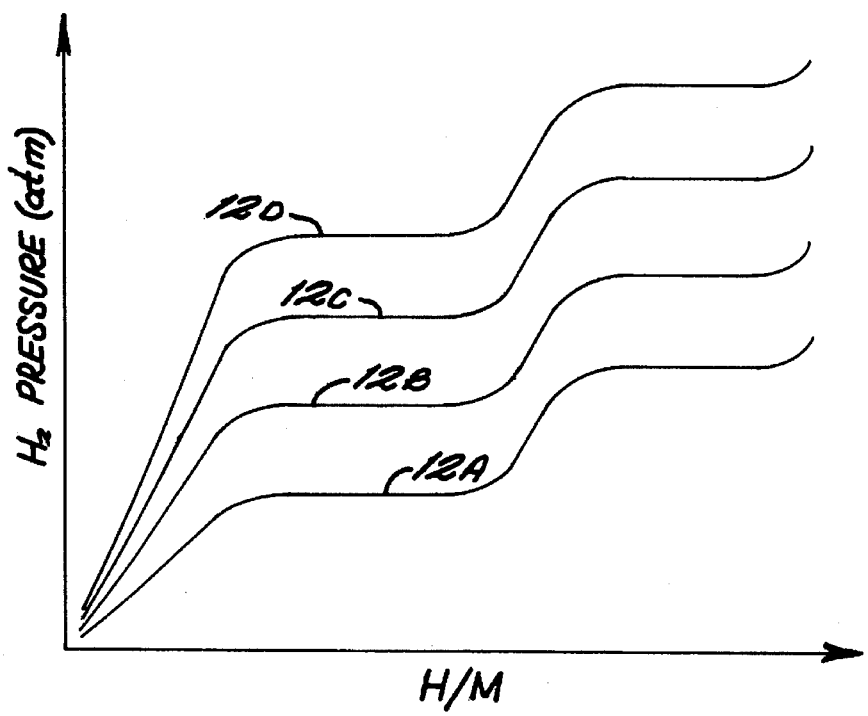
FIG. 2 shows a series of schematic hydrogen sorption isotherms for a hydride family according to a preferred embodiment of the present invention.

A series of sorption isotherms of a hydride family according to a preferred embodiment of the present invention is shown in FIG. 2. Isotherms 12a, 12b, 12c, 12d show the equilibrium pressure ($P_{H_2}$) versus the hydrogen content (H/M) of the composition, each isotherm measured at the same operating temperature. The family contains a plurality of hydrides, each hydride having a series of isotherms similar to that shown in FIG. 1. Each isotherm 12a, 12b, . . . of the family has at least one distinct plateau.

When a composition is formed from two or more of these hydrides, its isotherm may be used to determine its hydrogen content to a high degree of accuracy simply by measuring the temperature and pressure. Knowing the pressure and the available hydride storage capacity of the composition, one can determine accurately how much hydrogen is contained in the composition. The greater the number of hydrides present in the mixture, each in the same amount, the more uniformly the isotherm will change with hydrogen content of the composition.

Metal hydrides that can be used in the composition include Zr, Ti, V, Nb, Pd; binary, tertiary, and more complex alloys of La, Al, Cu, Ti, Co, Ni, Fe, Zr, Mg, Ca, Mn, the rare earth's, and so forth; and mixtures thereof. For example, the hydridable $AB_{5-x}C_x$ alloy families, where $0.1 \leq x \leq 1$ and the letters A, B, and C represent elements, can be used in the composition. In particular, the tanthanum-nickel-aluminum alloys represented by the formula $LaNi_{5-x}Al_x$ ($0.1 \leq x \leq 1$) are usable in the composition. Other suitable hydrides with well-defined plateau regions include the Zr—Ti—Cr—Fe alloys and the Fe—Mn—Ti—V alloys.

For many applications, it is desirable to use hydrides with low hysteresis. Such hydrides may be used with the invention, however, hysteresis effects are minimized by the stepwise isotherms of the composition. Therefore, the invention is not limited to use with low-hysteresis hydrides.

By way of example, a composition may be made with three hydrides with different, distinct plateaus. The hydrides may be three different alloys of a family or any combination of three hydrides that have different plateaus. The amount of each hydride to be in the composite can be selected based on the length of each plateau and the pressure difference between adjacent plateaus. The optimum constituents of the composition are best found by a modest degree of experimentation for each particular application.

Compositions containing 2–3 hydrides may still have step-wise isotherms. Compositions containing at least four hydrides have isotherms with regions where the pressure $P_{H_2}$ is related to the hydrogen content H/M by the equation:

$$\ln P_{H_2} = a + b(H/M) + c(H/M)^2 + \ldots,$$

where a, b, c, . . . are constants for each isotherm. With a suitable choice of hydrides, the isotherms have regions where the contribution of second-order and higher-order polynomials is sufficiently small that $\ln P_{H_2}$ varies approximately linearly with H/M, so that:

$$\ln P_{H_2} = a + b(H/M).$$

The constants a and b may be adjusted by varying the relative proportions of the various hydrides of the same family or different hydrides in the mixture. For example, where the mixture contains hydrides with well-defined plateau regions, a and b depend on the lengths of the individual plateaus and the pressure differences between adjacent plateaus.

Since the isotherms of the individual hydrides in the mixture contribute to the overall isotherm, the constants a and b are best determined empirically for each particular hydride mixture. Once a and b are known, the hydrogen content of the mixture can be found by measuring $P_{H_2}$ and computing $H/M = (\ln P_{H_2} - a)/b$ using the appropriate isotherm.

To obtain a composition having approximately linear isotherms, the mixture preferably can be made by selecting equimolar amounts of different hydrides from a family of alloys such as the $\text{LaNi}_{5-x}\text{Al}_x$ ($0.1 \leq x \leq 1$) alloys. As noted above, the isotherms of composition can be varied by varying the proportions of the constituent metals. Depending on the choice of hydrides, different proportions may be needed to obtain a mixture having approximate linear isotherms. If desired, the constituents of the mixture may be chosen to provide a nonlinear relationship between $P_{H_2}$ and H/M.

Alloys suitable for use with the invention are made by mixing together the proper amounts of granules, powder or small ingots of the constituent pure metals. The constituents of each alloy are melted in an arc or induction furnace to form the alloy, in an inert atmosphere or under vacuum, then cooled to room temperature. The alloys may be melted and cooled several times to ensure their homogeneity. After cooling, the alloys are ground and sifted to obtain the desired particle size for use with the invention.

Before combining, the particles of the alloys are activated by degassing, then saturated with hydrogen and heated to remove the absorbed hydrogen.

The properties of the composition depend upon the properties of its constituent hydrides. Therefore, care must be taken to maintain the chemical and structural integrity of the hydrides during processing and use. For example, if the hydrides are metals or alloys, temperatures exceeding the softening point could change the lattice structure of the composition. Temperatures exceeding the melting point could form a new alloy with different hydrogen-absorption properties.

The following non limiting examples further illustrate a hydride composition according to a preferred embodiment of the present invention.

EXAMPLE 1

A hydride composition containing equimolar amounts of two $\text{LaNi}_{5-x}\text{Al}_x$ alloys was prepared. The mixture contained 52.14 wt. % $\text{LaNi}_{4.51}\text{Al}_{0.49}$ (molecular wt. 416.9 g) and 47.86 wt. % $\text{LaNi}_{4.20}\text{Al}_{0.80}$ (molecular wt. 407.0 g). A 0.0075-liter hydride bed containing 5.277 g of the mixture was maintained at a temperature of approximately 120° C. The bed was in fluid communication with a calibration volume of 0.0327 L.

Figure 3:
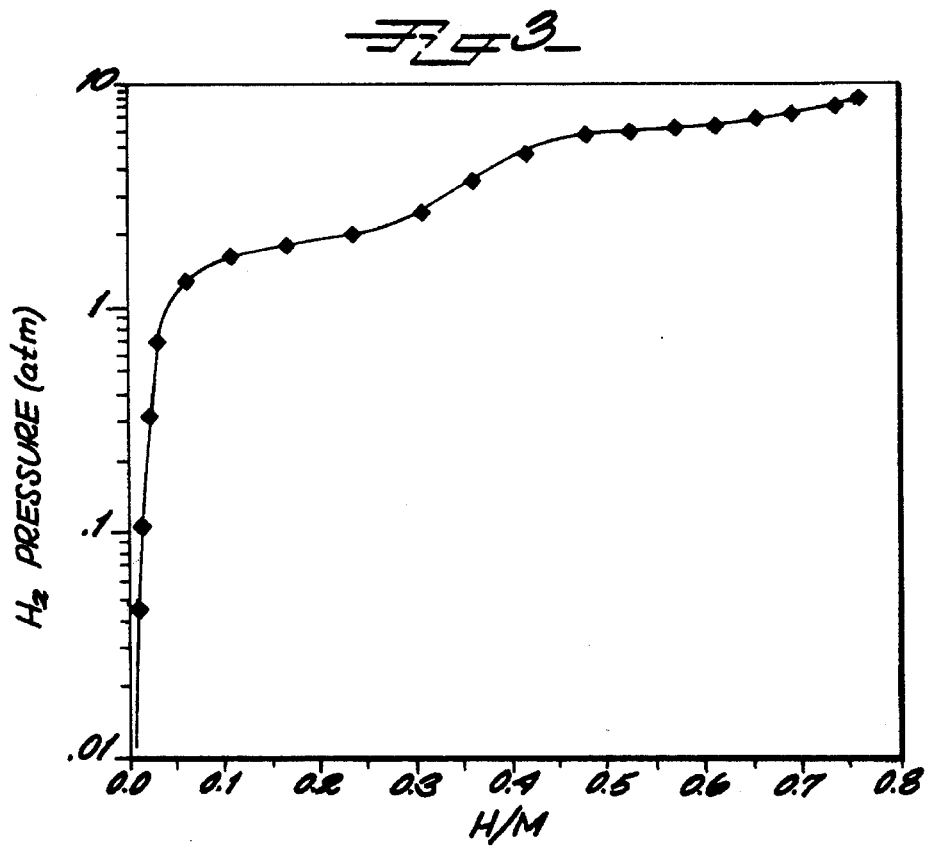
FIG. 3 shows a hydrogen sorption isotherm for a hydride composition according to a preferred embodiment of the present invention.

To obtain an isotherm, a known quantity of hydrogen ($H_0$) was admitted into the hydride bed and allowed to equilibrate. The equilibrium pressure (i.e., the partial pressure of hydrogen above the bed) was measured, then the free hydrogen was transferred to the calibration volume. The quantity of free hydrogen ($H_f$) was computed from the ideal gas law, using measurements of the temperature and pressure in the calibration volume. The hydrogen content of the mixture was found by subtracting $H_f$ from $H_0$ and expressing the result in terms of H/M, that is, the number of hydrogen atoms per metal atom. As seen in FIG. 3, the isotherm had two plateaus, at hydrogen pressures of approximately 2 atm (H/M≈0.1–0.3) and 6 atm (H/M≈0.4–0.7).

EXAMPLE 2

A hydride composition containing equimolar amounts of five $\text{LaNi}_{5-x}\text{Al}_x$ alloys was prepared. The mixture contained the following alloys:

| x | alloy | molecular wt. (g) |
|---|---|---|
| 0.74 | $\text{LaNi}_{4.26}\text{Al}_{0.74}$ | 408.9 |
| 0.80 | $\text{LaNi}_{4.20}\text{Al}_{0.80}$ | 407.0 |
| 0.86 | $\text{LaNi}_{4.14}\text{Al}_{0.86}$ | 405.1 |
| 0.91 | $\text{LaNi}_{4.09}\text{Al}_{0.91}$ | 403.5 |
| 0.96 | $\text{LaNi}_{4.04}\text{Al}_{0.96}$ | 402.3 |

The molecular weight of the mixture was 405.4 g.

A 0.010-liter hydride bed containing 5.629 g of the mixture was maintained at a temperature of approximately 120° C. The bed was in fluid communication with a calibration volume of 0.185 L. The composition was maintained at approximately 120° C., and an isotherm was obtained as described above.

Figure 4:
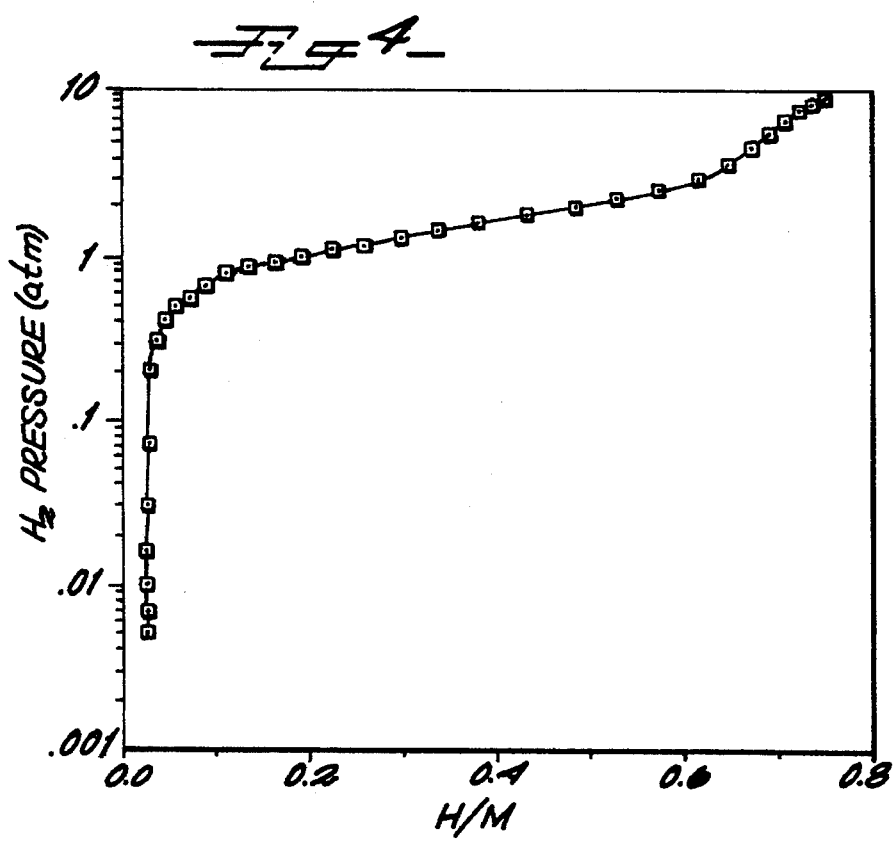
FIG. 4 shows a hydrogen sorption isotherm for a hydride composition according to another preferred embodiment of the invention.

When the hydrogen equilibrium pressure was plotted on a logarithmic scale, the step-wise plateaus of the individual hydrides merged into an approximately linear, sloping plateau region between $P_{H_2}$≈0.6 atm–3 atm (H/M≈0.10–0.65) (FIG. 4).

A hydride composition according to the present invention may be used in an apparatus for absorbing, storing and releasing hydrogen. A partially cut-away, perspective view of such an apparatus is shown in FIG. 5a. An apparatus 20 includes a housing 22 with an inlet conduit 24 and an outlet conduit 26. Conduit 26 carries a screen 28, positioned generally as shown. Conduit 24 carries a similar screen (not shown). Valves 32, 34 and pressure sensors 36, 38 are disposed in conduits 24, 26, respectively. Apparatus 20 is provided with means for controlling temperature, such as a heating/cooling jacket or coil 40.

Housing 22 contains a hydride composition 42 according to the present invention. With valve 32 open and valve 34 closed, hydrogen gas is passed into housing 22 through inlet 24. When valves 32 and 34 are closed, the quantity of hydrogen in the interior of housing 22 is constant and the hydrogen gas pressure above composition 42 will adjust itself to an equilibrium pressure as composition 42 absorbs hydrogen. If composition 42 is saturated with hydrogen, the equilibrium pressure is approximately equal to the plateau pressure at the temperature concerned. If composition 42 contains less hydrogen, the equilibrium pressure is less than the plateau pressure.

An alternative embodiment of an apparatus according to the invention is shown in FIG. 5b. An apparatus 50 includes a housing 52, and a conduit 54 in fluid communication with the interior of housing 52. Conduit 54 carries a screen 56, similar to screen 28 of apparatus 20. A valve 58 and a pressure sensor 60 are disposed in conduit 54, generally as shown. Coil 62 contains a heating/cooling fluid for controlling the temperature in the interior of housing 52. Housing 52 contains a quantity of a hydride composition 42 as described above.

The components of apparatus 20 (and apparatus 50) have sufficient mechanical strength to withstand the pressure inside housing 22 (and housing 52). The components of apparatus 20 are preferably made of stainless steel or other materials that are compatible with composition 42 and the operating environment of the apparatus. When apparatus 20 is in use, the pressure inside housing 22 may range from a few atmospheres to 100 atm. or higher, depending on the choice of hydride, the temperature, and the amount of hydrogen absorbed by composition 42.

The quantity of hydrogen that can be absorbed by composition 42 depends on the choice of hydrides used in the mixture. It is well known that hydrides are capable of absorbing very large amounts of hydrogen, so that when saturated with hydrogen, a hydride may have a hydrogen density equivalent to that of liquid hydrogen.

For composition 42 to absorb hydrogen, the hydrogen gas pressure inside housing 22 (or housing 52) must be higher than the plateau pressure. At any given temperature, when the pressure is at the plateau pressure, composition 42 is in equilibrium with the surrounding atmosphere and neither absorbs nor releases hydrogen. When the hydrogen pressure is increased above the plateau pressure, the temperature of composition 42 rises as the composition absorbs hydrogen, until a new equilibrium state is reached. If the increased hydrogen pressure is maintained by supplying hydrogen to housing 22 via inlet 24, composition 42 eventually becomes saturated with hydrogen. Conversely, when the hydrogen pressure is lowered, the temperature of composition 42 decreases as it desorbs hydrogen until equilibrium is reached.

Hydrogen absorption is an exothermic process, that is, the temperature of composition 42 rises as it absorbs hydrogen. For any hydride, the higher the temperature, the higher the pressure that is needed for the material to absorb a predetermined quantity of hydrogen. As the temperature rises, composition 42 absorbs less and less hydrogen until a new equilibrium state is reached. Therefore, to maintain absorption, composition 42 may be cooled by pumping a cooling fluid from a source (not shown) through coil 40. Hydrogen desorption is an endothermic process, therefore, composition 42 is warmed to release hydrogen therefrom.

Whether apparatus 20 is operated in the hydrogen-absorption or hydrogen-desorption mode is determined by regulating its temperature: cooling composition 42 for absorption and warming composition 42 for desorption. The operating temperature range of apparatus 20 depends on the choice of hydrides for composition 42. If the temperature of composition 42 is known, its hydrogen content may be determined simply by measuring the hydrogen pressure $P_{H_2}$ and computing H/M from the appropriate isotherm.

To increase the efficiency of hydrogen absorption/desorption, the surface area of composition 42 is maximized by supplying the composition in the form of small particles. For many hydrides, the particle size is reduced with each absorption/desorption cycle until eventually the particles disintegrate into a fine-grained powder. Furthermore, the powder can readily become entrained in the gas stream, migrating with it and causing contamination of downstream piping and equipment. Screens 28 have sufficient porosity to allow the flow of gas therethrough, but a fine mesh to substantially prevent escape of hydride fines from housing 22.

Apparatus 20 may be used to store hydrogen, separate hydrogen from a gaseous mixture, and separate the three hydrogen isotopes (protium, deuterium, tritium) from each other. For example, to separate hydrogen from a gaseous mixture, the mixture is pumped into housing 22 through inlet 24. As the mixture passes through housing 22, it contacts hydride composition 42 where at least a portion, and preferably most of the hydrogen in the mixture is absorbed. Substantially hydrogen-free gas exits housing 22 via outlet 26. Housing 22 is then heated to recover the stored hydrogen.

To separate hydrogen isotopes from each other, composition 42 contains one of two types of hydride. The first type, such as palladium, absorbs the lighter hydrogen isotopes better than the heavier isotopes, that is, it absorbs protium better than deuterium and tritium, and deuterium better than tritium. The second type of hydride, such as vanadium, absorbs the heavier isotopes better than the lighter isotopes, that is, it absorbs tritium better than deuterium and protium, and deuterium better than protium.

Composition 42 is any suitable hydride mixture according to the present invention. Composition 42 may comprise a mixture of hydride compositions (other than metals or alloys), as long as the constituents of composition 42 have a suitable range of hydrogen equilibrium pressures for the practice of the invention.

Composition 42 preferably has a series of hydrogen sorption isotherms with regions that are approximately described by the equation $\ln P_{H_2} = a + b(H/M)$. However, other hydride mixtures having isotherms where $P_{H_2}$ varies in a readily measurable manner with H/M over the operating range of apparatus 20 may be used. Thus, the hydrogen content H/M of composition 42 can be determined from measurements of $P_{H_2}$ without the necessity for desorbing the hydrogen into a standard volume.

It will be apparent to those skilled in the art that many changes and substitutions can be made to the preferred embodiment herein described without departing from the spirit and scope of the present invention as defined by the appended claims.

What is claimed is:

1. A method for making a composition for use in storing hydrogen, said method comprising the steps of:

selecting at least two hydride formers, each hydride former of said at least two hydride formers having a different hydrogen sorption isotherm compound to an isotherm of any other hydride former of said at least two hydride formers;

making particles of said each hydride former of said at least two hydride formers;

degassing said particles of said each hydride former of said at least two hydride formers;

saturating said particles of said each hydride former of said at least two hydride formers with hydrogen, heating said particles of said each hydride former of said at least two hydride formers to remove said hydrogen from said particles of said each hydride former of said at least two hydride formers; and making said hydrogen storage composition from said particles by mixing said particles of said at least two hydride formers, said hydride composition having a composite hydrogen sorption isotherm different from any hydrogen sorption isotherm of said at least two hydride formers, said degassing, saturating and heating steps occurring before said mixing of said particles of said at least two hydride formers.

2. The method as recited in claim 1, wherein said at least two hydride formers are selected so that said composite hydrogen sorption isotherm is nearly linear.

3. The method as recited in claim 1, wherein said at least two hydride formers is at least four hydride formers.

4. The method as recited in claim 1, wherein said particles are made to be less than approximately 100 microns in size.

5. The method as recited in claim 1, wherein said at least two hydride formers are selected from a family of hydride formers given by the formula $LaNi_{5-x}Al_x$, where x is no smaller than 0.1 and no greater than 1.

6. The method as recited in claim 1, wherein said at least two hydride formers are selected from the group consisting of a La—Ni—Al alloy, a Zr—Ti—Cr—Fe alloy, and a Fe—Mn—Ti—V alloy.

7. The method as recited in claim 1, wherein said method further comprises the steps of:

preparing said at least two hydride forming alloys, each alloy of said at least two hydride forming alloys containing lanthanum, nickel and aluminum in a different ratio, said alloy being represented by the formula $LaNi_{5-x}Al_x$, where x is no smaller than 0.1 and no greater than 1.

8. The method as recited in claim 1, wherein each hydride former of said at least two hydride formers has a softening temperature and said each hydride former is heated to a temperature not exceeding said softening temperature.

9. A composition for use in storing hydrogen, said composition comprising a mixture of particles containing at least two individually activated heat treated hydride formers, each hydride former of said at least two hydride formers maintaining a different hydrogen sorption isotherm at each temperature, when in said mixture.

10. The composition as recited in claim 9, wherein said at least two hydride formers further comprises at least four hydride formers.

11. The composition as recited in claim 9, wherein said at least two hydride formers are selected from different compositions of alloys of an alloy family.

12. The composition as recited in claim 9, wherein said at least two hydride formers are selected from different compositions of a single alloy family selected from the group consisting essentially of a La—Ni—Al alloy family, a Zr—Ti—Cr—Fe alloy family, and a Fe—Mn—Ti—V alloy family.

13. The composition as recited in claim 9, wherein said at least two hydride formers are selected from a family of hydride formers given by the formula $LaNi_{5-x}Al_x$, where x is no smaller than approximately 0.1 and no greater than approximately 1.

14. The composition as recited in claim 9, wherein said particles of said at least two hydride formers are less than approximately 100 microns in size.

15. The composition as recited in claim 9, wherein each hydride former of said at least two hydride formers has a softening temperature and said each hydride former is heated to a temperature not exceeding said softening temperature.

* * * * *